(12) United States Patent
Foor et al.

(10) Patent No.: US 11,014,401 B2
(45) Date of Patent: May 25, 2021

(54) HUB CAP ASSEMBLY WITH SIGHT GLASS

(71) Applicant: DANA HEAVY VEHICLE SYSTEMS GROUP, LLC, Maumee, OH (US)

(72) Inventors: William J. Foor, Clayton, MI (US); Edward E. Stuart, Payne, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 377 days.

(21) Appl. No.: 16/062,844

(22) PCT Filed: Dec. 13, 2016

(86) PCT No.: PCT/US2016/066366
§ 371 (c)(1),
(2) Date: Jun. 15, 2018

(87) PCT Pub. No.: WO2017/106181
PCT Pub. Date: Jun. 22, 2017

(65) Prior Publication Data
US 2019/0023065 A1    Jan. 24, 2019

Related U.S. Application Data

(60) Provisional application No. 62/267,655, filed on Dec. 15, 2015.

(51) Int. Cl.
*B60B 7/04*    (2006.01)
*B60B 7/06*    (2006.01)
(Continued)

(52) U.S. Cl.
CPC ............... *B60B 7/002* (2013.01); *B60B 7/04* (2013.01); *B60B 7/066* (2013.01); *B60B 2900/561* (2013.01); *B60C 23/003* (2013.01)

(58) Field of Classification Search
CPC ............ B60B 7/002; B60B 7/14; B60B 7/066
See application file for complete search history.

(56) References Cited

U.S. PATENT DOCUMENTS 3,064,982 A * 11/1962 Stephens .............. F16J 15/3232
277/402
3,089,738 A * 5/1963 Steiner .................. B60B 35/025
384/473

(Continued)

FOREIGN PATENT DOCUMENTS

CN    102069680       5/2011
WO    2017106181 A1   6/2017

OTHER PUBLICATIONS

International Search Report and Written Opinion for International Patent Application No. PCT/US2013/035588, dated Sep. 6, 2013, issued by the European Patent Office. 13 pages.

(Continued)

*Primary Examiner* — Jason R Bellinger
(74) *Attorney, Agent, or Firm* — McCoy Russell LLP

(57) ABSTRACT

A hub cap assembly with a retaining device (100), and at least one housing portion (34) with an annular recess (98) in an inner surface with a sight glass (12) disposed in the annular recess and positioned axially between the retaining device and the housing portion. The hub cap assembly can be part of a wheel end assembly for use with a central tire inflation system (CTIS).

13 Claims, 10 Drawing Sheets

(51) Int. Cl.
 *B60B 7/00* (2006.01)
 *B60C 23/00* (2006.01)

(56) References Cited

U.S. PATENT DOCUMENTS

| | | |
|---|---|---|
| 3,114,579 A | 12/1963 | Isenbarger |
| 4,073,540 A | 2/1978 | Jackowski |
| 4,834,464 A | 5/1989 | Frehse |
| 4,883,106 A | 11/1989 | Schultz |
| 4,892,128 A | 1/1990 | Bartos |
| 5,482,358 A | 1/1996 | Kuck |
| 5,505,525 A | 4/1996 | Denton |
| 5,584,949 A | 12/1996 | Ingram |
| 5,658,053 A | 8/1997 | Vencill |
| 5,752,746 A | 5/1998 | Perry |
| 5,860,708 A | 1/1999 | Borders |
| 6,273,519 B1 | 8/2001 | Tsou |
| 6,447,072 B1 | 9/2002 | Johnson |
| 6,488,342 B1 | 12/2002 | De Paiva |
| 6,575,028 B2 | 6/2003 | Colussi |
| 6,783,191 B1 | 8/2004 | Slesinski |
| 9,132,704 B2 | 9/2015 | Wilson |
| 9,221,308 B2 | 12/2015 | Nelson |
| D749,482 S | 2/2016 | Schroeder |
| 9,290,044 B2 | 3/2016 | Leung |
| 10,556,469 B2 * | 2/2020 | Foor .................... B60C 23/003 |
| 2013/0199685 A1 | 8/2013 | Nelson |

OTHER PUBLICATIONS

International Search Report and Written Opinion for International Patent Application No. PCT/US2016/057880, dated Jan. 19, 2017, issued by the European Patent Office. 10 pages.

* cited by examiner

HUB CAP ASSEMBLY WITH SIGHT GLASS

RELATED APPLICATIONS

This application is a 371 of PCT/US2016/066366 filed Dec. 13, 2016 which claims benefit under 35 U.S.C. § 119(e) of the provisional application filed under 35 U.S.C. § 111(b) on Dec. 15, 2015 granted Ser. No. 62/267,655, which are hereby incorporated by reference in their entirety.

FIELD OF THE INVENTION

The invention relates to a hub cap assembly and, more particularly, to a hub cap assembly with a sight glass. The hub cap assembly can be part of a wheel end assembly for use with a central tire inflation system (CTIS).

BACKGROUND OF THE INVENTION

Tire inflation systems for vehicles provide a vehicle the versatility of adjusting tire pressures while the vehicle is stationary or in motion. For example, utilizing a tire inflation system, the tire pressure of one or more wheel assemblies may be decreased to increase tire traction, or increased to reduce rolling resistance and increase the vehicle's fuel efficiency and tire life-span. Tire inflation systems known in the art often employ wheel end assemblies which permit fluid communication between the rotating portions and non-rotating portions of the vehicle. The wheel end assemblies known in the art are often complex and expensive to manufacture. In addition, it would be beneficial to have a simple way to monitor an oil level in the hub cap and wheel end assemblies.

Therefore, it would be desirable to provide a hub cap assembly and a wheel end assembly which overcomes the disadvantages of the prior art by reducing number and complexity of components, have better oil sealing capabilities and provide a simple way to monitor oil levels.

SUMMARY OF THE INVENTION

In one embodiment, described is a hub cap assembly with a retaining device, and at least one housing portion with an annular recess in an inner surface with a sight glass disposed in the annular recess and positioned axially between the retaining device and the housing portion.

In another embodiment, described is a hubcap assembly with a hubcap housing having a cylindrical main body portion defining an interior chamber for holding lubricant. The main body portion has an annular shoulder formed on an interior surface. The annular shoulder has a shoulder axial surface and a shoulder radial surface substantially perpendicular to one another. The hubcap assembly has an outer retaining ring with a notch formed on an axially inboard surface. The notch has a notch inner radial surface and a notch outer surface substantially perpendicular to one another. The hub cap assembly also has a transparent sight glass with a side portion, an outer step portion, a main body portion, a lip portion, and a central bore. The side portion comprises a side portion end surface and a sight glass radially outward surface with an annular groove for receiving a sealing member. Lastly, the hub cap assembly has a sealing member. Upon assembly, the side portion end surface of the sight glass will be in clearance with and axially outward from the shoulder radial surface, the sight glass radially outward surface will be in clearance with and radially inward from both the shoulder axial surface and the notch inner radial surface, and the outer step portion will be in clearance with and axially inward from the notch outward surface. Further, the sealing member is within the annular groove of the sight glass radially outward surface and creates a sealing engagement between the sight glass and the shoulder axial surface.

In another embodiment, described is sight glass with a side portion, an outer step portion, a main body portion, a lip portion, and a central bore. The lip portion extends axially inboard from and is radially inward from the main body portion, the outer step portion extends radially outward from and axially inboard from the main body portion, and the side portion extends axially inboard from the outer step portion.

BRIEF DESCRIPTION OF THE DRAWINGS

The above, as well as other advantages of the process will become readily apparent to those skilled in the art from the following detailed description when considered in the light of the accompanying drawings in which.

DETAILED DESCRIPTION

Figure 1:
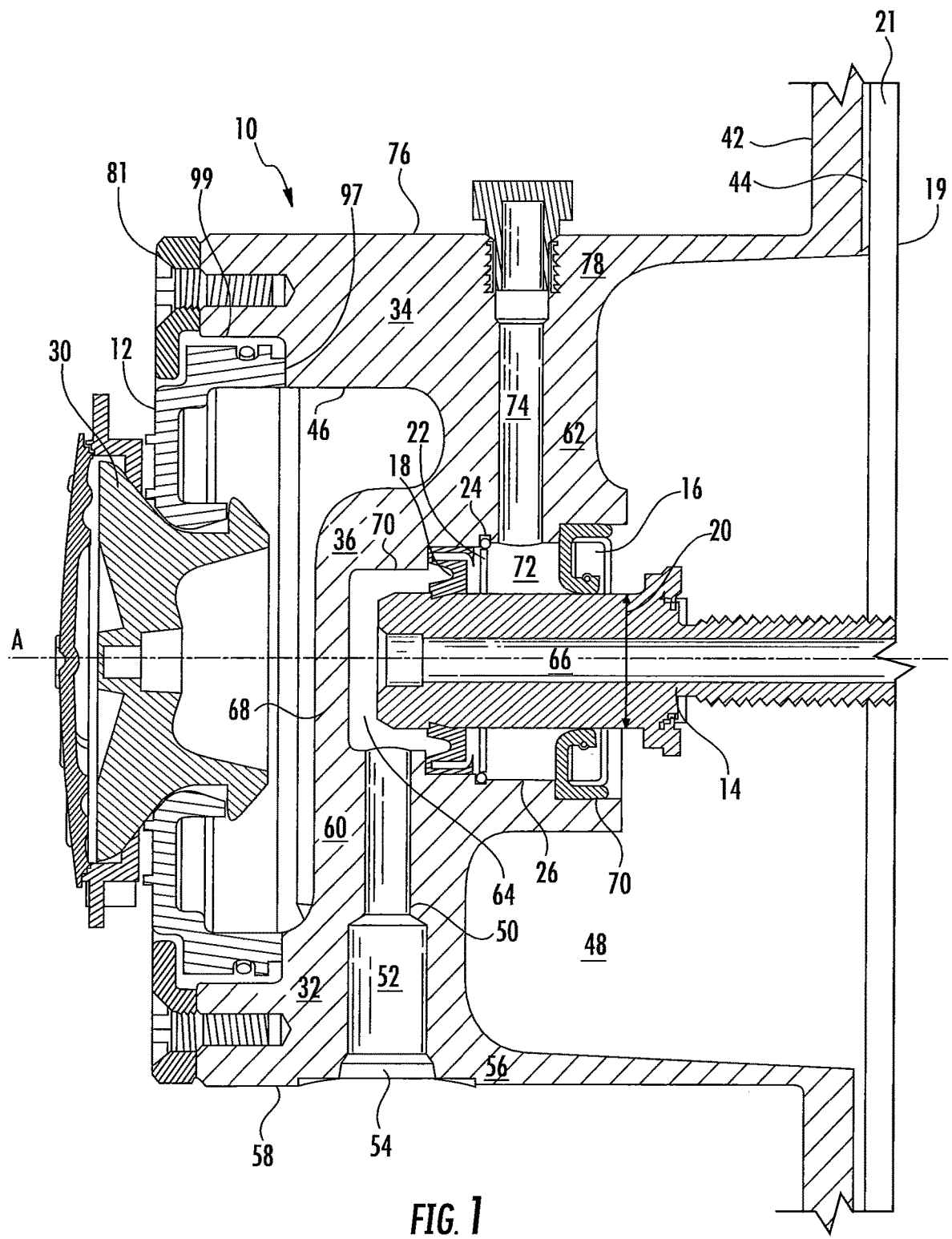
FIG. 1 is a sectional view of a hub cap assembly in accordance with an embodiment of the invention.

It is to be understood that the invention may assume various alternative orientations and step sequences, except where expressly specified to the contrary. It is also to be understood that the specific assemblies and methods illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise. Also, although they may not be, like elements in various embodiments may be commonly referred to with like reference numerals within this section of the application. Unless specifically stated to the contrary, the word "or" is used herein in the conjunctive sense not the disjunctive sense.

Embodiments of a hub cap assembly 10 with a sight glass 12 are provided herein. The hub cap assembly 10 may be utilized as portion of a steer axle. However, it should be appreciated that the hub cap assembly 10 may be utilized with other types of axles. For example, in an embodiment, the hub cap assembly 10 may be utilized with a lift axle. It should also be appreciated that the hub cap assembly 10 may be utilized with a steerable axle or a non-steerable axle. In still other embodiments, the hub cap assembly 10 may be utilized with a drive axle or non-drive axle.

Figure 2:
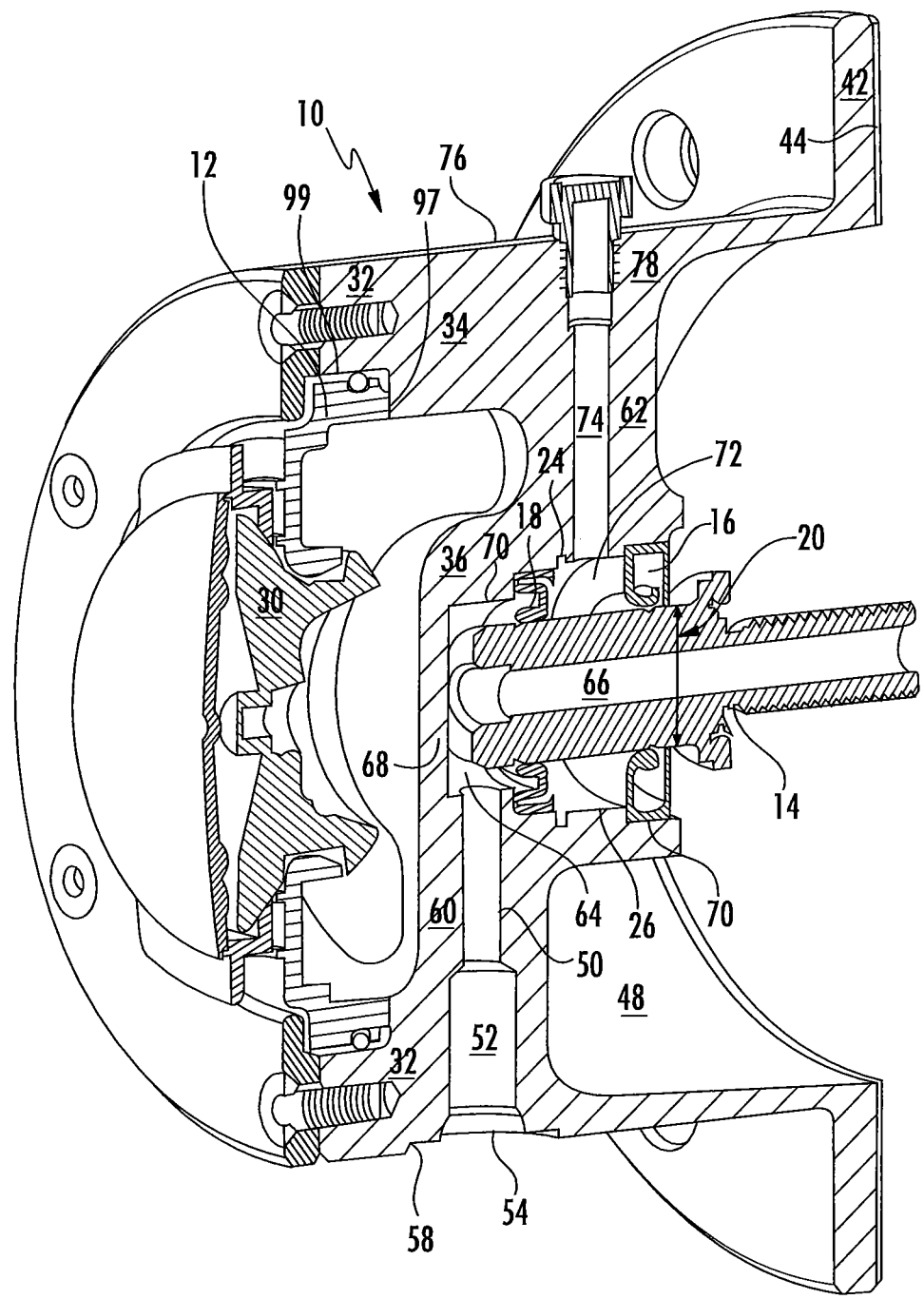
FIG. 2 is a sectional view in perspective of a hub cap assembly in accordance with an embodiment of the invention.
Figure 3A:
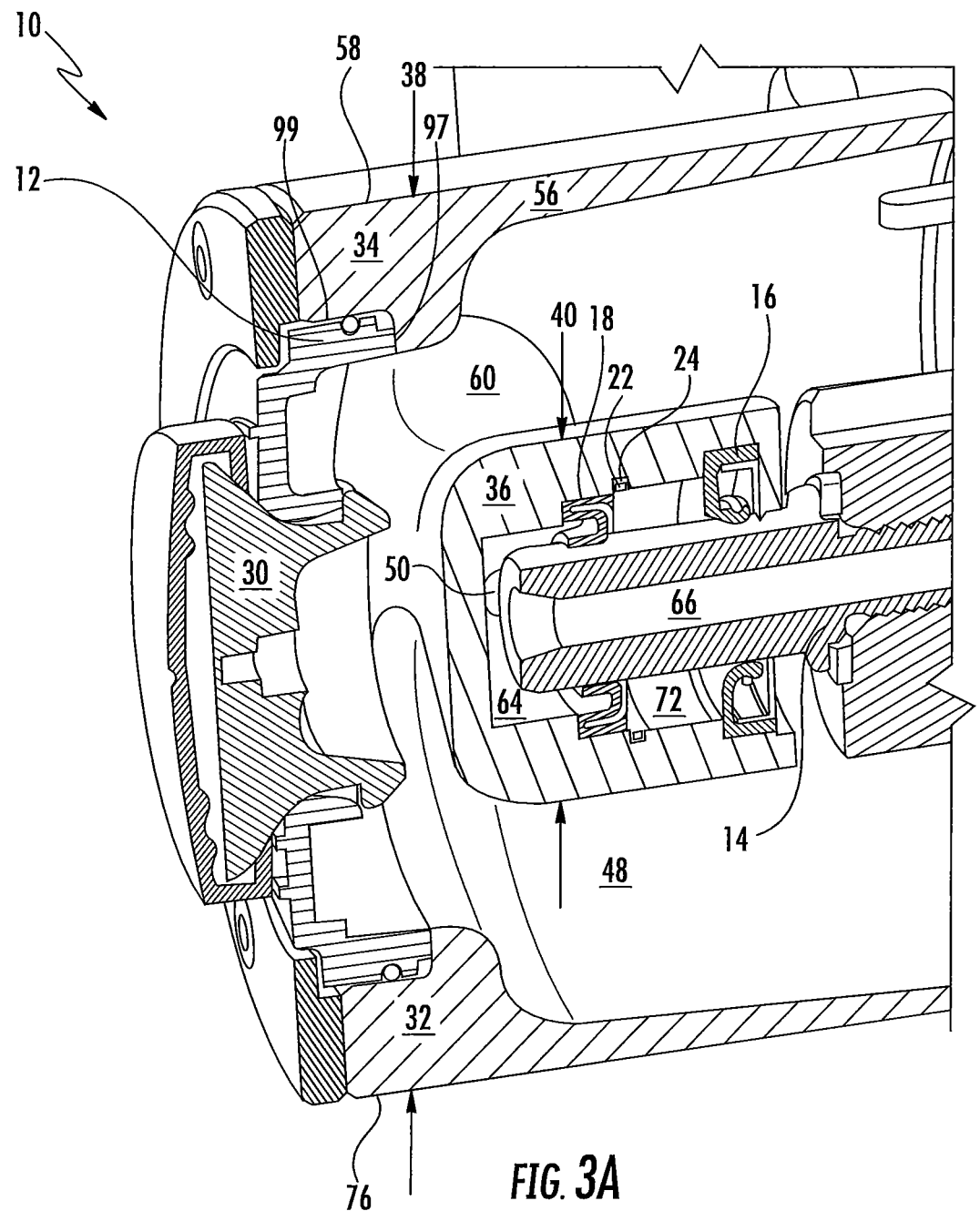
FIG. 3A is a sectional view in perspective of a hub cap assembly in accordance with an embodiment of the invention.

Referring now to FIGS. 1-3, certain embodiments of the hub cap assembly 10 are used with a wheel end assembly (shown only in part). Portions of the wheel end assembly may be as described in U.S. patent application Ser. Nos. 15/178,690 (now issued as U.S. Pat. No. 10,562,357) and 15/264,427 (now issued as U.S. Pat. No. 10,556,469), the entire disclosures of which are hereby incorporated by reference. Preferably, the wheel end assembly is utilized as a steer axle wheel end assembly. In such embodiments, the steer axle wheel end assembly comprises a steer axle having an outboard end. The outboard end of the steer axle is the location of the hub cap assembly 10.

The hub cap assembly 10 is rotatable around an axis of rotation A and disposed about an air spindle 14. The air spindle 14 is a non-rotating member that is attached to the wheel end assembly, the remaining portions of which are not shown. A rotary oil seal 16 is disposed around an outer diameter 20 of the air spindle 14. A snap ring may also be disposed around the outer diameter 20 of the air spindle 14 to ensure the location of the rotary oil seal 16.

The hub cap assembly 10 may comprise a rotary air seal 18. The rotary air seal 18 is spaced apart from and provided outboard of the rotary oil seal 16. The rotary air seal 18 is disposed around the outer diameter 20 of the air spindle 14. The air spindle 14 extends in an outboard direction beyond the rotary oil seal 16 and the rotary air seal 18. Preferably, a snap ring 22 is disposed around the outer diameter 20 of the air spindle 14 to ensure the location of the rotary air seal 18. The snap ring 22 may be secured in a groove 24 formed in an inner surface 26 of the hub cap assembly 10. The rotary oil seal 16 and the rotary air seal 18 help prevent, or reduce, oil leakage and air leakage. The rotary air seal 18 also prevents pressurized air from entering the hub 19. The rotary oil seal 16 and the rotary air seal 18 both seal against the inner surface 26 of the hub cap assembly 10.

In an embodiment, the hub cap assembly 10 comprises a pressure relief mechanism 30 to relieve any pressure increase adjacent the bearing of the wheel assembly. Preferably, the pressure relief mechanism 30 is located in an outboard end portion 32 of the hub cap assembly 10. The pressure relief mechanism 30 may be of the rubber plug or diaphragm variety. The location of the pressure relief mechanism 30 may also be utilized to add or remove oil from the hub cap assembly 10 or wheel end assembly.

In an embodiment, the hub cap assembly 10 comprises a first housing portion 34 connected to a second housing portion 36. The first housing portion 34 surrounds the second housing portion 36. In an embodiment, the first housing portion 34 has a first housing portion outer diameter 38 which is greater than a second housing portion outer diameter 40 of the second housing portion 36. Preferably, at least a portion of the first housing portion 34 and the second housing portion 36 are formed in a unitary manner. The hub cap assembly 10 may be manufactured out of any material, having the necessary characteristics to enable its function in the wheel end assembly for a variable length of time, including but not limited to aluminum, aluminum alloy, steel, iron, titanium, carbon fiber, polymer materials or any combination thereof.

The first housing portion 34 comprises a radially extending flange 42 which abuts a hub cap fastener flange 21 of the hub 19. A seal member 44 is provided between the radially extending flange 42 and the hub cap fastener flange 21 to prevent oil from escaping therebetween. The radially extending flange 42 is formed in a unitary manner with the first housing portion 34 and extends radially outward therefrom. The first housing portion 34 comprises an inner surface 46 which defines a cavity 48 containing oil.

A portion of a hub cap assembly air passage 50 is formed in the first housing portion 34. On an end, the hub cap assembly air passage 50 is in fluid communication with one or more additional air passages. The one or more additional air passages are utilized to enable fluid communication between the hub cap assembly air passage 50 and a wheel valve or a tire. In these embodiments, the one or more air passages may be attached to the hub cap assembly air passage 50 via a port 52.

The port 52 comprises a port opening 54. In an embodiment (not depicted), the port 52 may also comprise a port member. When provided, the port member is coupled to a first radially outer wall portion 56 of the first housing portion 34. In this embodiment, the port member and the first radially outer wall portion 56 of the first housing portion 34 may be formed in a unitary manner. The port member extends beyond a first outer surface 58 of the first radially outer wall portion 56 of the first housing portion 34. The port opening 54 is in fluid communication with the one or more air passages and is capable of coupling thereto. In an embodiment, the one or more air passages are defined by one or more tire air hoses.

A first arm 60 and a second arm 62 attach the first housing portion 34 to the second housing portion 36. The first arm 60 and the second arm 62 each extend in a radial direction and are in a parallel relationship with each other. Preferably, the first arm 60 and the second arm 62 are formed in a unitary manner with the first housing portion 34 and the second housing portion 36.

In certain embodiments, the first arm 60 is axially displaced from the second arm 62. The hub cap assembly air passage 50 extends from the first radially outer wall portion 56 through the first arm 60 to the second housing portion 36. In the second housing portion 36, the hub cap assembly air passage 50 is in fluid communication with an air chamber 64. The air chamber 64 enables fluid communication between a fluid passage 66 in the air spindle 14 and the hub cap assembly air passage 50. In an embodiment, the hub cap assembly air passage 50 is oriented in a perpendicular relationship with the air chamber 64 and the longitudinal axis of the air spindle 14.

The air chamber 64 is defined by an outboard wall portion 68 of the second housing portion 36, the rotary air seal 18, and an inner surface 70 of the second housing portion 36. Preferably, the rotary air seal 18 is attached to and seals against inner surface 70 of the second housing portion 36. The inner surface 70 of the second housing portion 36 may comprise an annular groove 24 for securing the snap ring 22 to the hub cap assembly 10.

Preferably, the rotary oil seal 16 is attached to and seals against the inner surface 70 of the second housing portion 36. The inner surface 70 of the second housing portion 36 may also comprise an annular groove for securing a locating washer (if provided) to the hub cap assembly 10.

A vent chamber 72 is also provided. The vent chamber 72 is defined by air spindle 14, rotary oil seal 16, the rotary air seal 18 and snap ring 22, and the inner surface 70 of the second housing portion 36. Preferably, the vent chamber 72 is of an annular shape. If pressurized air passes from the air chamber 64 through the rotary air seal 18 to the vent chamber 72, the pressurized air will pass into a vent passage 74. On an end, the vent passage 74 intersects and is in fluid communication with the vent chamber 72. On an opposite end, the vent passage 74 is in fluid communication with the atmosphere. The vent passage 74 is oriented in a perpendicular relationship with the vent chamber 72 and the longitudinal axis of the air spindle 14. Also, the vent passage 74 is oriented in a parallel relationship with the hub cap assembly air passage 50. The vent passage 74 extends from the second housing portion 36, through the second arm 62, and to a second outer surface 76 of a second radially outer wall portion 78 where it communicates with the atmosphere. Advantageously, the hub cap assembly 10 allows compressed air that escapes past the rotary air seal 18 to vent to the atmosphere and oil that escapes past the rotary oil seal 16 to escape to the atmosphere by way of the vent passage 74.

In an embodiment, the hub cap assembly 10 and the air spindle 14 are not in direct contact. More particularly, the second housing portion 36 and the air spindle 14 are separated from each other by the air chamber 64, the rotary air seal 18, the vent chamber 72, and the rotary oil seal 16. The hub cap assembly 10 and the air spindle 14 are in fluid communication via the air chamber 64. More particularly, the second housing portion 36 is in fluid communication with the air spindle 14 via the air chamber 64 and vice versa. For example, when it is desired to increase tire pressure, pressurized air is transferred from the air spindle 14 to the hub cap assembly 10 via the air chamber 64. Similarly, when it is desired to decrease tire pressure, pressurized air is transferred from the hub cap assembly 10 to the air spindle 14 via the air chamber 64.

Figure 3B:
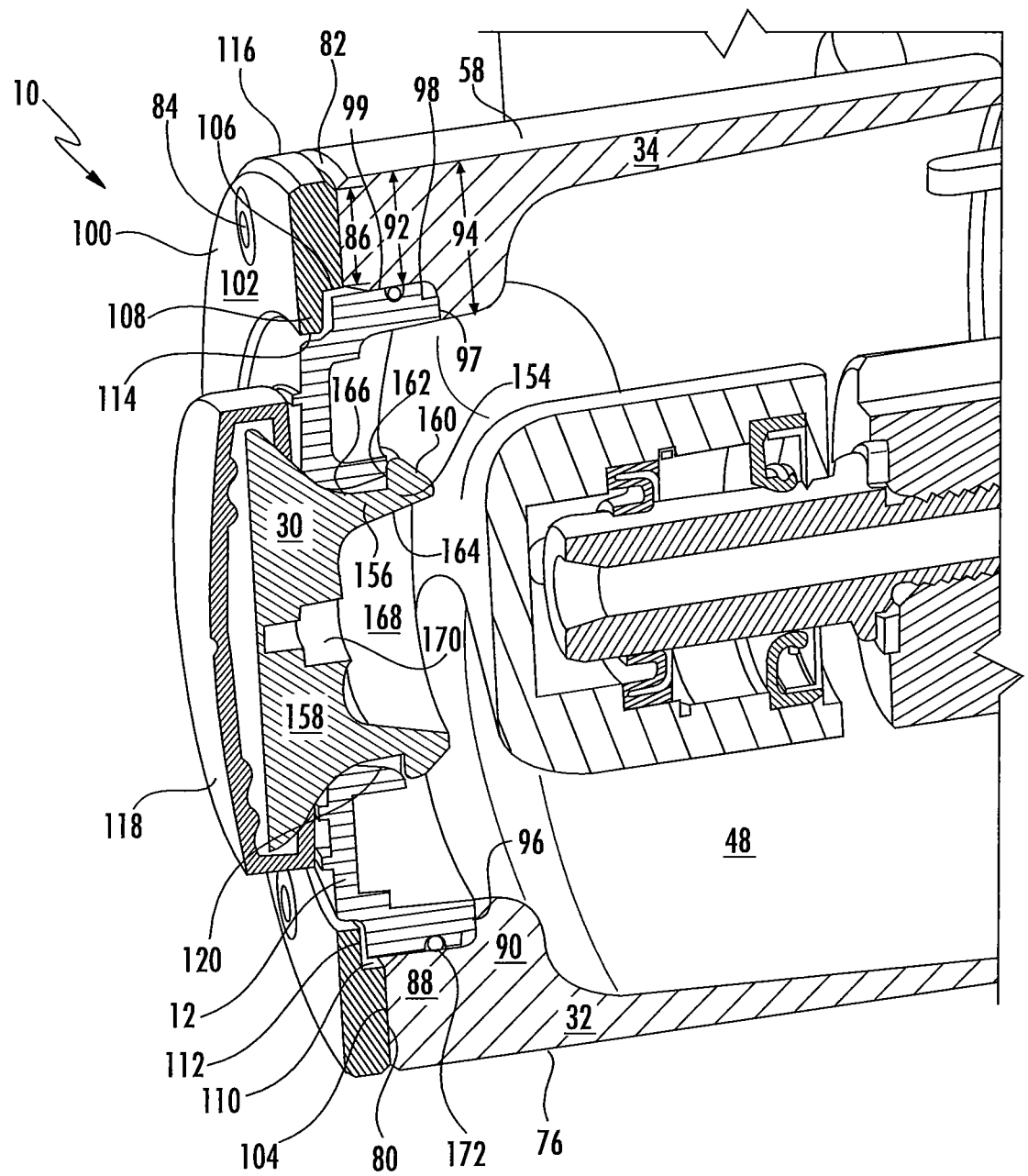
FIG. 3B is the same view as FIG. 3A and is presented to avoid crowding of reference characters in a single panel.

Referring to FIG. 3B, the first housing portion 34 also comprises an outboard surface 80. The transition 82 from the first outer surface 58 or second outer surface 76 can be of any angle or any shaped curve. Regarding the transition 82, the outboard surface 80 may be perpendicular to the first outer surface 58 or second outer surface 76, or the outboard surface 80 may intersect with the first outer surface 58 or second outer surface 76 at other angles, such as, but not limited to, small draft angles provided to aid in manufacturing. The outboard surface 80 may be perpendicular to the axis of rotation. The outboard surface 80 may have apertures 81 (identified in FIG. 1) for receiving fasteners 84. The outboard surface 80 will have an outboard surface width 86.

The outboard end portion 32 is comprised of a terminal portion 88 and an inner portion 90. The terminal portion 88 has a terminal portion thickness 92. The inner portion 90 has an inner portion thickness 94. In certain embodiments, the inner portion thickness 94 is greater than the terminal portion thickness 92. The terminal portion thickness 92 can be the same as or greater than the outboard surface width 86. The difference in the terminal portion thickness 92 and the inner portion thickness 94 creates a shoulder 96 which defines an annular recess 98 in the outboard end portion 32. The shoulder 96 has a shoulder axial surface 97 and a shoulder radial surface 99 which are substantially perpendicular to each other.

In addition, the hub cap assembly 10 can further comprise a retainer ring 100. The retainer ring 100 may have apertures 81 for receiving fasteners 84. The retainer ring 100 has an outer surface 102 and an inner surface 104. The inner surface 104 of the retainer ring 100 has a notch 106 disposed in a radially inward portion 108 of the retainer ring 100. The notch 106 creates a notch inner radial surface 110, a notch outward surface 112, and a ring inner radial surface 114. Preferably, the notch inner radial surface 110 and ring inner radial surface 114 are both perpendicular to the notch outward surface 112. The retainer ring 100 will also have an outer radial surface 116. The outer radial surface 116 may have any suitable profile. One example is shown in FIG. 3B.

The hub cap assembly 10 may also comprise a cover 118 as shown in the several figures. The cover 118 can be unitary or can be comprised of more than one piece. The cover 118 can be plastic, metal, or any other suitable material. The cover 118 can be decorated with brand, trademark, or patent information. One, non-limiting example of a suitable cover 118 can be found in U.S. Pat. No. 6,783,191, which is hereby incorporated by reference in its entirety, to the extent allowed by law.

Figure 4:
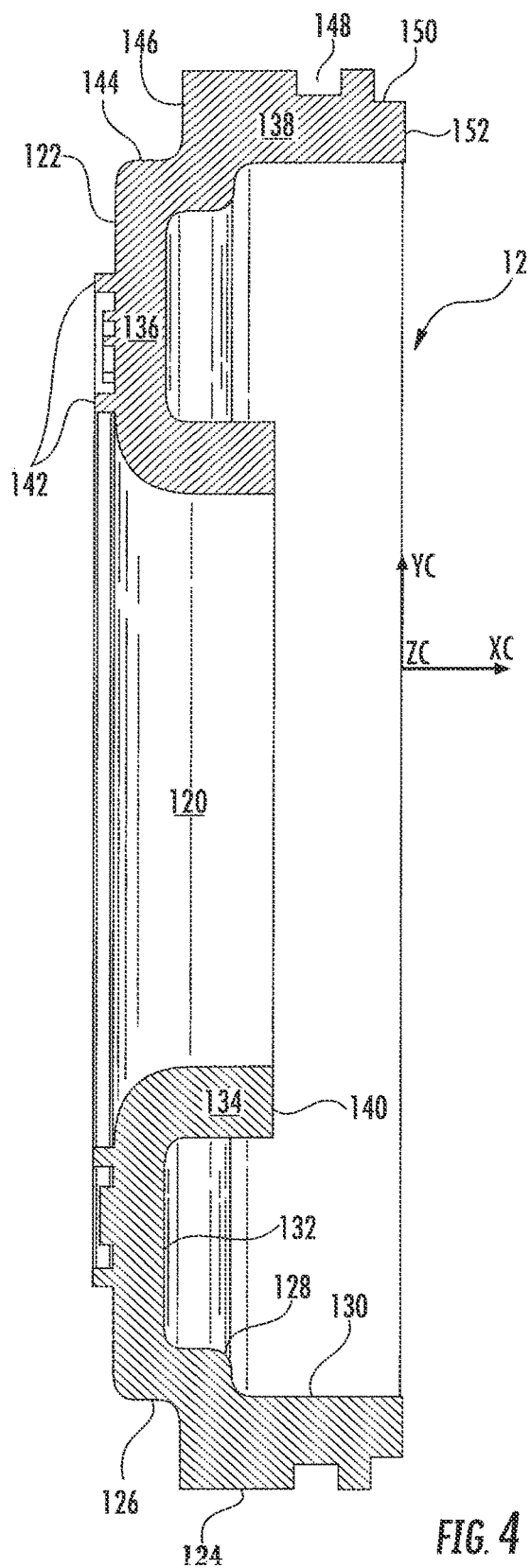
FIG. 4 is a sectional view of a sight glass in accordance with an embodiment of the invention.
Figure 5:
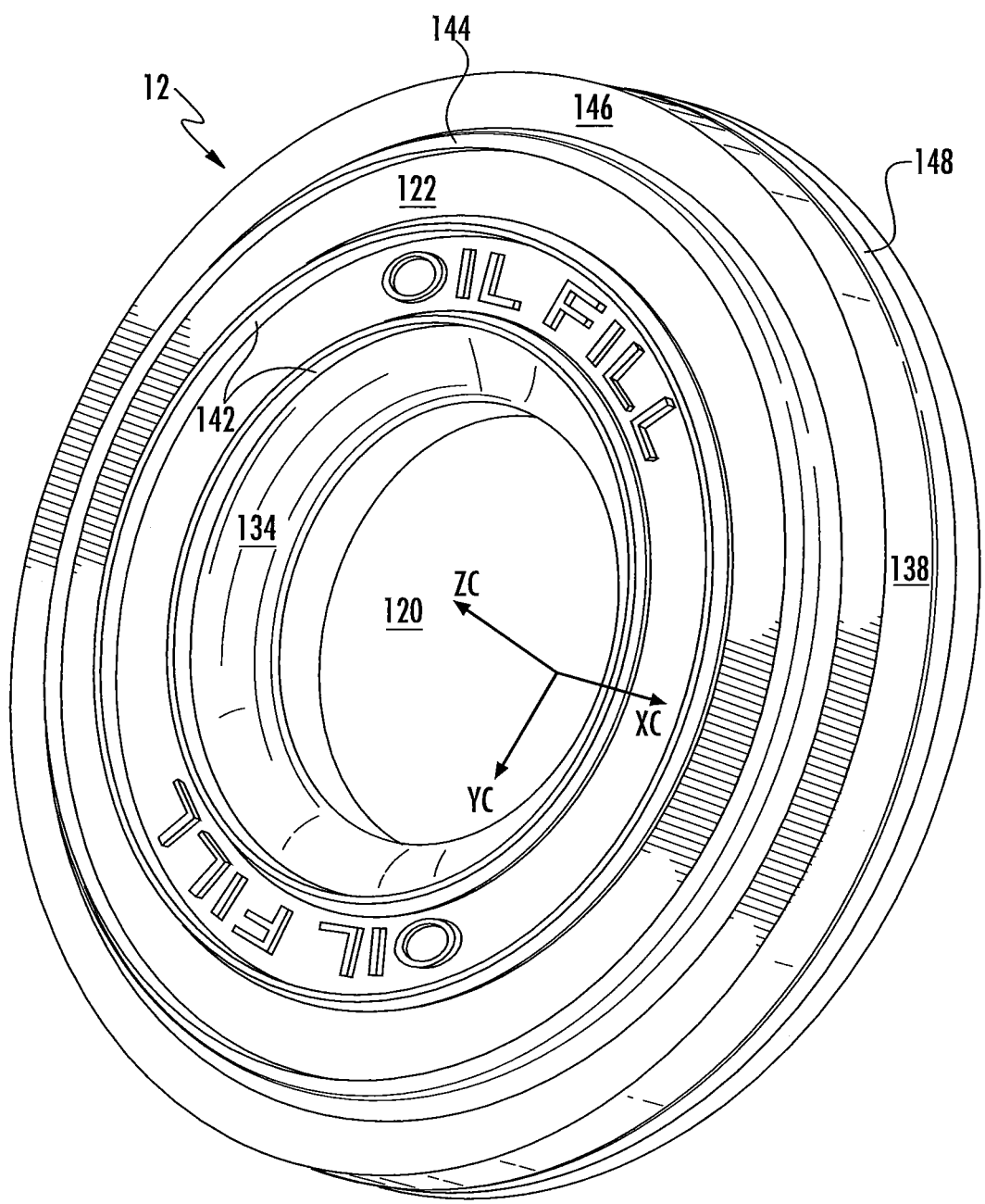
FIG. 5 is an outboard view in perspective of a sight glass in accordance with an embodiment of the invention.
Figure 6:
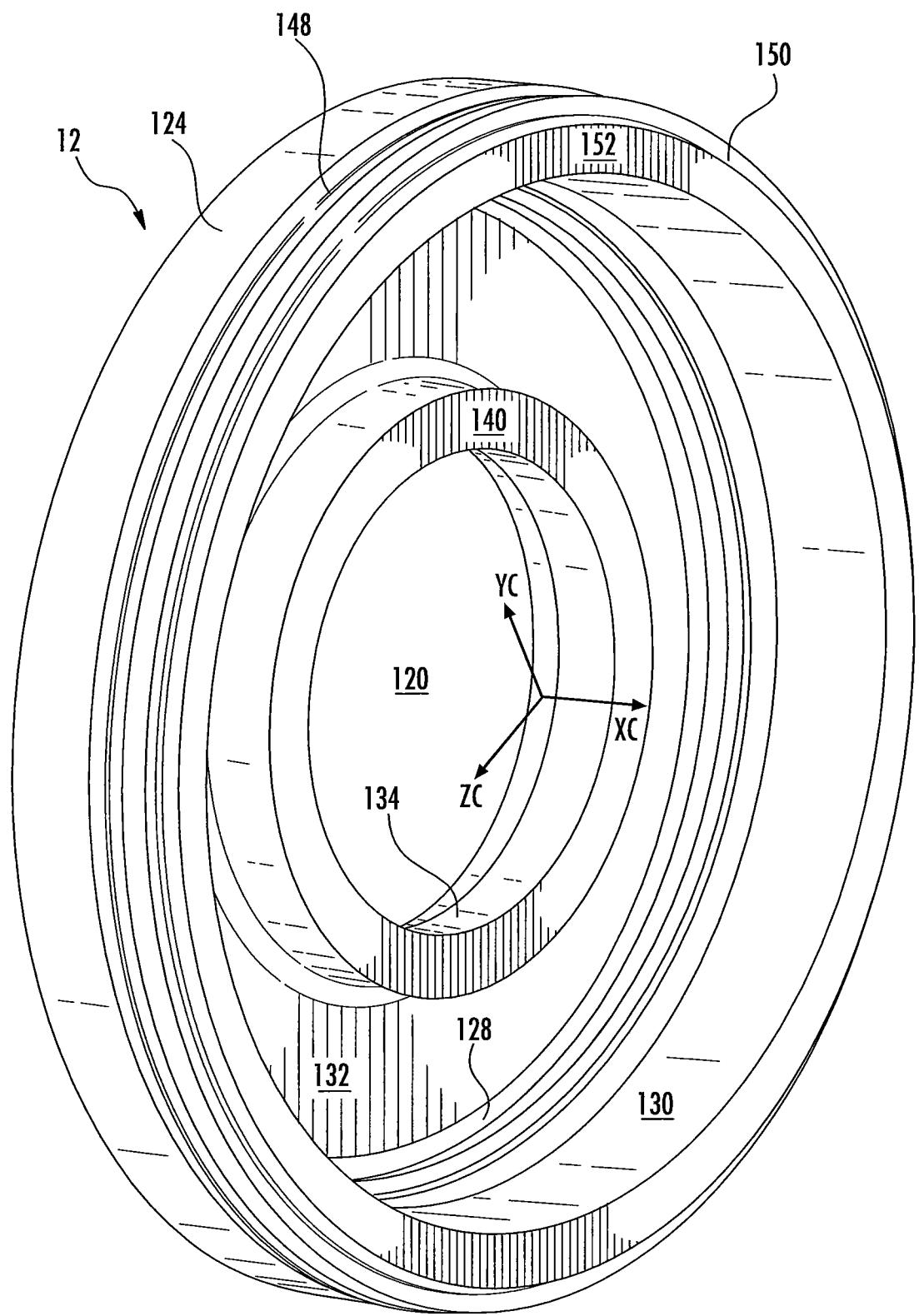
FIG. 6 is an inboard view in perspective of a sight glass in accordance with an embodiment of the invention.

As shown in FIGS. 3B-6, the sight glass 12 is annular with a central bore 120. Referring specifically to FIGS. 4-6, the sight glass 12 may comprise a sight glass outboard surface 122, a sight glass radially outward surface 124, an outer step portion 126, an inner corner 128, a sight glass radially inward surface 130, a sight glass inboard surface 132, a lip 134, a main body portion 136, and a side portion 138.

The lip 134 is radially inward and extends perpendicularly from the main body portion 136 in an arcuate fashion. The lip 134 defines the central bore 120. The lip 134 has a lip surface 140 which faces the inboard direction.

The main body portion 136 extends radially from the lip 134 to the outer step portion 126. The main body portion 136 may have one or more ridges 142 extending from the sight glass outboard surface 122. The one or more ridges 142 can be located so as to provide demarcation for easy visualization of the oil level relative to the desired oil level.

The outer step portion 126 extends outward radially and inboard in the axial direction from the main body portion 136. The outer step portion 126 comprises a step portion radial surface 144 and a step portion axial surface 146. The step portion axial surface 146 is perpendicular to both the step portion radial surface 144 and the sight glass radially outward surface 124. The step portion radial surface 144 is parallel to, radially inward from, and more outboard than the sight glass radially outward surface 124. The outer step portion 126 acts as a transition between the main body portion 136 and the side portion 138.

The side portion 138 may have a groove 148 in the sight glass radially outward surface 124 disposed therein. The side portion 138 may have a corner cutaway 150 concentric with groove 148 and inboard therefrom. The side portion 138 has a side portion end surface 152.

The sight glass 12 can be made from any suitable material known in the art. Preferably, the sight glass 12 is formed from a transparent material, such as a clear plastic.

Referring back to FIG. 3B, in certain embodiments, the pressure relief mechanism 30 comprises a tail portion 154, a through portion 156, and an external portion 158. The tail portion 154 can be wedged shaped such that there is a first wedge surface 160, a second wedge surface 162, and a pressure relief mechanism inner surface 164. The tail portion 154 is contiguous with the through portion 156. The through portion 156 may be tapered from the outboard to inboard direction. The through portion 156 is contiguous with both the tail portion 154 and the external portion 158. The pressure relief mechanism transition 166 from the through portion 156 to the external portion 158 can be arcuate in fashion. The external portion 158 is larger in diameter than either the through portion 156 or the tail portion 154. Likewise, the tail portion 154 is larger in diameter than the through portion 156. The pressure relief mechanism 30 can have a hollow interior 168 with an opening 170 and is in fluid communication with the oil filled cavity 48 of the hub cap assembly 10 and wheel end assembly.

Upon assembly, the pressure relief mechanism 30 will at least partially reside in the central bore 120 of the sight glass 12. The second wedge surface 162 of the tail portion 154 of the pressure relief mechanism 30 will be in sealing contact with the lip surface 140 of the sight glass 12. The pressure relief mechanism transition 166 will be in sealing contact with the lip 134 of sight glass 12. The through portion 156 is radially inward from lip 134. The external portion 158 of the pressure relief mechanism 30 extends outboard past the sight glass outboard surface 122. The external portion 158 of the pressure relief mechanism 30 can be disposed within cover 118.

The sight glass 12 is disposed within annular recess 98. Side portion end surface 152 of sight glass 12 contacts shoulder axial surface 97 of shoulder 96 of first housing portion 34. Sight glass radially outward surface 124 is in clearance with the shoulder radial surface 99 of shoulder 96 of terminal portion 88 of the outboard end portion 32 of the first housing portion 34.

A sealing member 172 resides within groove 148, forming a sealing engagement between the side portion 138 of the sight glass 12 and the terminal portion 88 of the outboard end portion 32 of the first housing portion 34. Preferably, the sealing member is of an annular shape. The sealing member 172 may be an O-ring. The sealing member 172 can be made of any suitable material known in the art.

When sight glass 12 is disposed within annular recess 98, the outer step portion 126 and main body portion 136 extend beyond the outboard surface 80 of the first housing portion 34. The outer step portion 126 of the sight glass 12 resides in the ring inner radial surface 114 of the retainer ring 100 such that:

(i) The notch inner radial surface 110 is in clearance with sight glass radially outward surface 124. Based on the tolerance stacks a clearance condition always exists between notch inner radial surface 110 and sight glass radially outward surface 124. These surfaces never touch. There is always a clearance condition between the components.

(ii) The notch outward surface 112 is in clearance with the step portion axial surface 146. Based on the design, a clearance condition or a touching condition can exist between notch outward surface 112 and step portion axial surface 146. If the sight glass 12 were to move outward (i.e. towards the left in the drawing) it will touch the retainer ring 100 thus keeping the sight glass 12 from falling out of the hub cap assembly 10.

(iii) The ring inner radial surface 114 is in clearance with the step portion radial surface 144. Based on the tolerance stacks a clearance condition always exists between ring inner radial surface 114 and step portion radial surface 144. These surfaces never touch. There is always a clearance condition between the components.

The inner surface 104 of the retainer ring 100 abuts the outboard surface 80 of the first housing portion 34. The apertures 81 in both the retainer ring 100 and the outboard surface 80 should align to receive fasteners 84 for connecting the retainer ring 100 and the first housing portion 34. By doing so, the retainer ring 100 serves to delimit the axial movement of the sight glass 12 between the inner portion 90 of the outboard end portion 32 of the first housing portion 34 and the radially inward portion 108 of the retainer ring 100. Preferably, the sight glass 12 has a small amount of axial movement relative to at least the first housing portion 34 in order to accommodate for manufacturing tolerances, expansion coefficient, movement, and the like. In some embodiments, the allowable axial movement can be 0.20-2.1 mm. In alternative embodiments, the allowable axial movement can be 0.25-1.8 mm. The sealing member 172 and fit between sight glass radially outward surface 124 and annular recess 98 control the radial location of sight glass 12.

Figure 7:
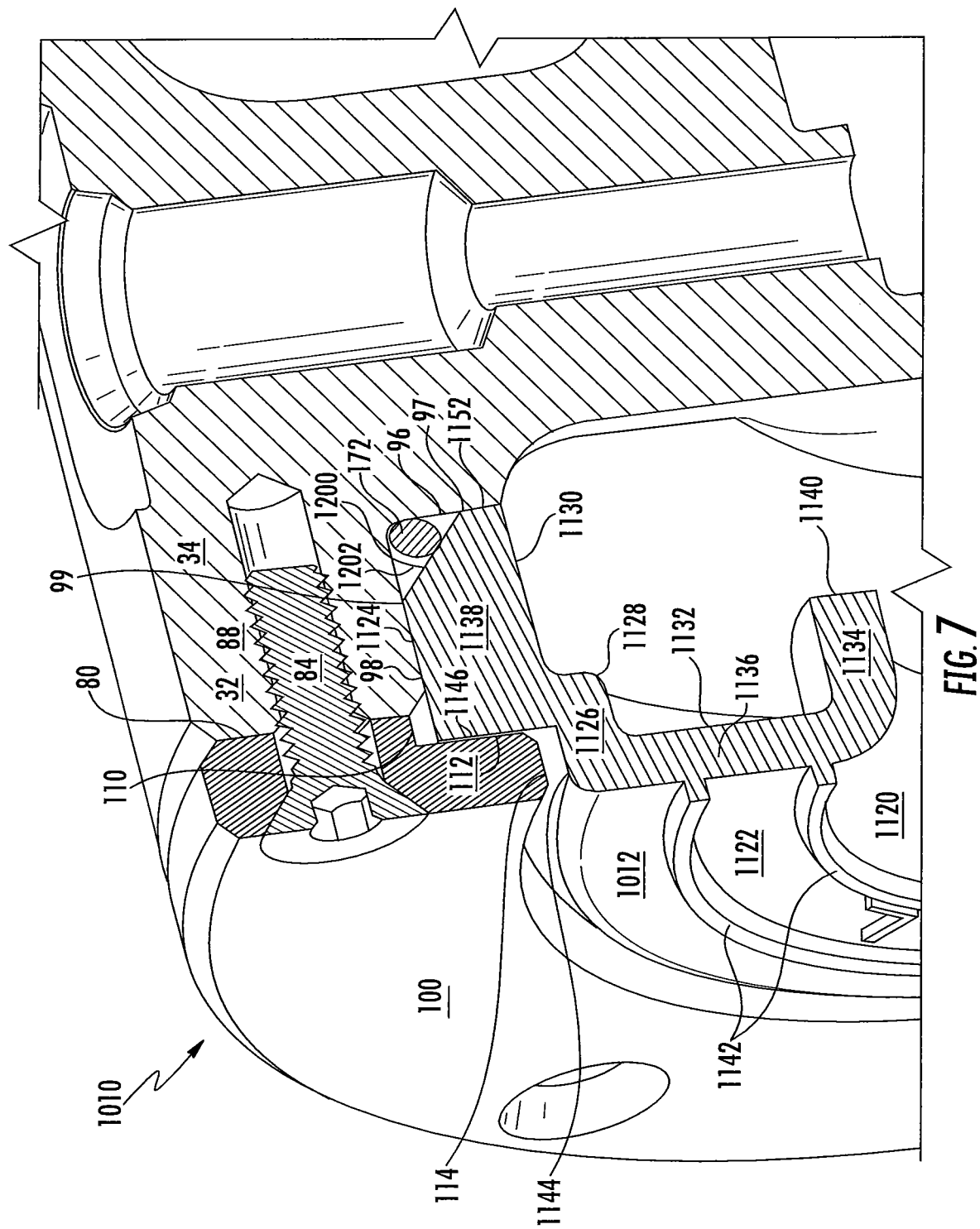
FIG. 7 is a sectional view in perspective of a hub cap assembly in accordance with an embodiment of the invention.
Figure 8:
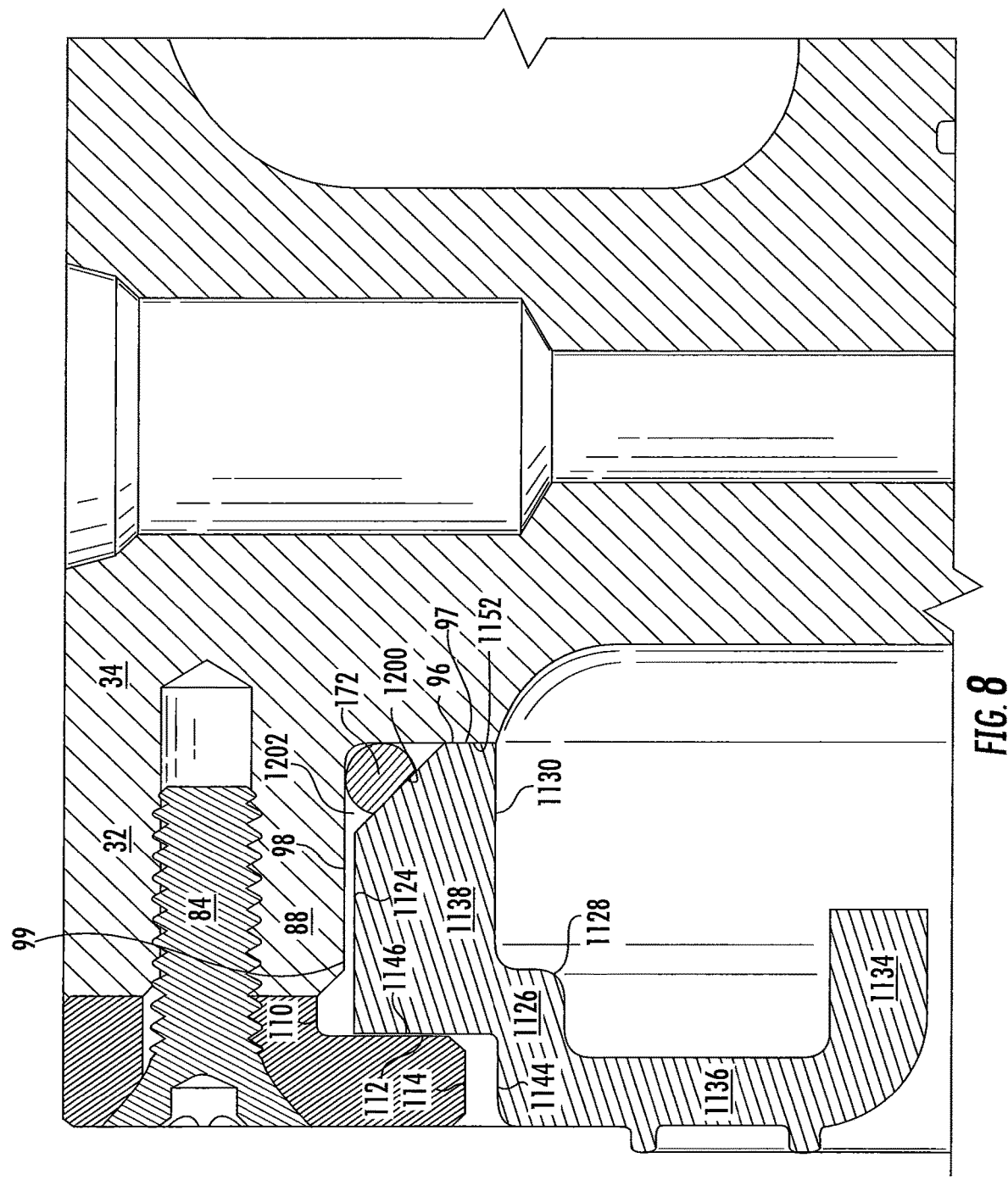
FIG. 8 is a partial sectional view showing an enlarged interface between the sight glass and hub cap housing portion shown in FIG. 7.
Figure 9:
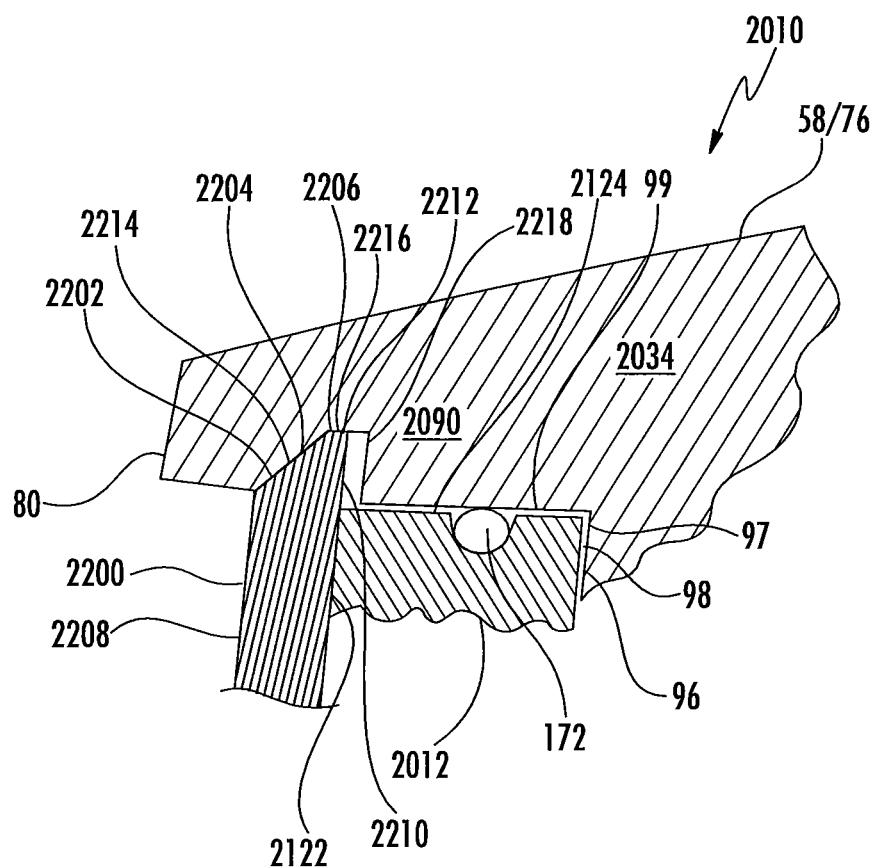
FIG. 9 is a partial sectional view of a hub cap assembly in accordance with an embodiment of the invention.

Alternate embodiments described herein include similar components to the hub cap assembly 10 illustrated in FIGS. 1-6. Other than the specific differences noted below, hub cap assembly 10 and hub cap assembly 1010 and 2010 are formed and operate in similar fashions. Reference numbers not specifically defined in the description supporting the alternate embodiments shown in FIGS. 7-9 are the same as described for the other figures. In addition, other methods of retaining the sight glass in an axial position are contemplated by this invention. It should be noted that aspects or features described for one embodiment can be used in conjunction with aspects or features described for an alternative embodiment, to the extent not incompatible with the described function, or to the extent not specified to the contrary herein.

FIGS. 7-8 illustrate a hub cap assembly 1010 and sight glass 1012 according to one alternate embodiment of the invention. The sight glass 1012 is annular with a central bore 1120. The sight glass 1012 may comprise a sight glass outboard surface 1122, a sight glass radially outward surface 1124, an outer step portion 1126, an inner corner 1128, a sight glass radially inward surface 1130, a sight glass inboard surface 1132, a lip 1134, a main body portion 1136, and a side portion 1138.

The lip 1134 is radially inward and extends perpendicularly from the main body portion 1136 in an arcuate fashion. The lip 1134 defines the central bore 1120. The lip 1134 has a lip surface 1140 which faces the inboard direction.

The main body portion 1136 extends from the lip 1134 to the outer step portion 1126. The main body portion 1136 may have one or more ridges 1142 extending from the sight glass outboard surface 1122. The one or more ridges 1142 can be located so as to provide demarcation for easy visualization of the oil level relative to the desired oil level.

The outer step portion 1126 extends outward radially and inboard in the axial direction from the main body portion 1136. The outer step portion 1126 comprises a step portion radial surface 1144 and a step portion axial surface 1146. The step portion axial surface 1146 is perpendicular to both the step portion radial surface 1144 and the sight glass radially outward surface 1124. The step portion radial surface 1144 is parallel to, radially inward from, and more outboard than the sight glass radially outward surface 1124. The outer step portion 1126 acts as a transition between the main body portion 1136 and the side portion 1138.

The side portion 1138 has a side portion end surface 1152. An angular surface 1200 is formed between sight glass radially outward surface 1124 and side portion end surface 1152.

The sight glass 1012 is disposed within annular recess 98. Side portion end surface 1152 of sight glass 1012 contacts shoulder axial surface 97 of shoulder 96 of first housing portion 34. As shown most clearly in FIG. 8, sight glass radially outward surface 1124 is in clearance with the shoulder radial surface 99 of shoulder 96 of terminal portion 88 of the outboard end portion 32 of the first housing portion 34. An annular angular space 1202 is formed between the angular surface 1200 of the side portion 1138 and the shoulder axial surface 97 and the shoulder radial surface 99.

A sealing member 172 resides within angular space 1202, forming a sealing engagement between the angular surface 1200 of the side portion 1138 of the sight glass 1012 and the shoulder axial surface 97 and the shoulder radial surface 99. Preferably, the sealing member is of an annular shape. The sealing member 172 may be an O-ring. The sealing member 172 can be made of any suitable material known in the art.

FIG. 9 illustrates a hub cap assembly 2010 and sight glass 2012 according to a second alternate embodiment of the invention. Hub cap assembly 2010 comprises an external snap ring 2200 instead of a retainer ring 100. In these embodiments, the external snap ring 2200 is an annular structure with a radially outer surface 2202. Radially outer surface 2202 may have any profile. As shown, a preferred embodiment has an axially outward angular portion 2204 and a flat portion 2206. In addition, the external snap ring 2200 will have an external snap ring outer face 2208 and an external snap ring inner face 2210.

The sight glass 2012 of this embodiment will be similar to the sight glass 12 of previously described embodiments, except that the sight glass 2012 will lack the sight glass outer step portion 126 or 1126 shown in the earlier figures. Instead, sight glass 2012 will comprise a transition directly from sight glass radially outward surface 124 or 1124 to sight glass outboard surface 122 or 1122.

Also, in this embodiment, the first housing portion 2034 of the hub cap assembly 2010, will be similar to the first housing portion 34 of the hub cap assembly 10 previously described for other embodiments, except that the outboard end portion 2090 of the instant embodiment is tapered and comprises a receiving space 2212. The receiving space 2212 has three surfaces: an angled surface 2214, a flat surface 2216, and a back surface 2218.

Similar to the retaining ring 100 in the previously described embodiments, the external snap ring 2200 delimits the axial movement of the sight glass 2012. In these embodiments, the sight glass 2012 is axially positioned between the external snap ring 2200 and between the shoulder axial surface 97 of the shoulder 96 of the first housing portion 2034. The radially outer surface 2202 of external snap ring 2200 is at least partially in contact with at least one of the angled surface 2214 or flat surface 2216, or back surface 2218 of the receiving space 2212 such that the receiving space 2212 holds the external snap ring 2200 in position. Preferably, in order to provide room for the small axial movement of the sight glass 2012 as described for sight glass 12 and 1012 above, external snap ring 2200 will fit tightly into receiving space 2212.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A hub cap assembly comprising:
a sight glass,
a retaining device,
at least one housing portion with an annular recess in an inner surface,
wherein the sight glass is disposed in the annular recess and positioned axially between the retaining device and the at least one housing portion, and wherein the sight glass includes a groove on a sight glass radially outward surface.

2. The hub cap assembly of claim 1, wherein at least a portion of the sight glass is directly, with no intervening component, positioned axially between the retaining device and the at least one housing portion.

3. The hub cap assembly of claim 1, wherein the retaining device is a retainer ring.

4. The hub cap assembly of claim 3, wherein the retainer ring has a notch and wherein the sight glass is disposed in both the annular recess and the notch.

5. The hub cap assembly of claim 1, wherein the retaining device is a snap ring disposed in a receiving space in the at least one housing portion, and wherein the receiving space is axially outboard in relation to the annular recess.

6. The hub cap assembly of claim 1, wherein the sight glass comprises the groove for receiving a sealing member.

7. The hub cap assembly of claim 6, wherein the hub cap assembly further comprises the sealing member disposed in the groove, and wherein the sealing member is in sealing engagement between the sight glass and the said at least one housing portion.

8. The hub cap assembly of claim 1, wherein the sight glass comprises an angled surface that, upon assembly, defines an angular space in the annular recess between the sight glass and the at least one housing portion.

9. The hub cap assembly of claim 8, wherein the hub cap assembly further comprises a sealing member disposed in the angular space and wherein the sealing member is in sealing engagement between the sight glass and the at least one housing portion.

10. A hubcap assembly comprising:
a hubcap housing comprising a cylindrical main body portion defining an interior chamber for holding lubricant, wherein the main body portion has an annular shoulder formed on an interior surface, the annular shoulder having a shoulder axial surface and a shoulder radial surface substantially perpendicular to one another;
an outer retaining ring with a notch formed on an axially inboard surface, the notch having a notch inner radial surface and a notch outer surface substantially perpendicular to one another;
a transparent sight glass comprises a side portion, an outer step portion, a main body portion, a lip portion, and a central bore, wherein the side portion comprises a side portion end surface and a sight glass radially outward surface with an annular groove for receiving a sealing member; and
a sealing member,
wherein, upon assembly, the side portion end surface of the sight glass will be axially outward from the shoulder axial surface, the sight glass radially outward surface will be in clearance with and radially inward from both the shoulder radial surface and the notch inner radial surface, and the outer step portion will be axially inward from the notch outward surface, and
wherein the sealing member will be disposed within the annular groove of the sight glass radially outward surface and create a sealing engagement between the sight glass and the shoulder radial surface.

11. A sight glass comprising,
a side portion, an outer step portion, a main body portion, a lip portion, and a central bore,
wherein the lip portion extends axially inboard from and is radially inward from the main body portion, wherein the outer step portion extends radially outward from and axially inboard from the main body portion, wherein the side portion extends axially inboard from the outer step portion, and wherein the sight glass includes a groove on a sight glass radially outward surface.

12. The sight glass of claim 11, wherein the side portion contains the groove for receiving a sealing member.

13. The sight glass of claim 11, wherein a surface at a transition from the sight glass radially outward surface to a side portion end surface is angled.

\* \* \* \* \*